United States Patent
Green et al.

(10) Patent No.: US 9,580,104 B2
(45) Date of Patent: *Feb. 28, 2017

(54) TERRAIN-BASED MACHINE COMPRISING IMPLEMENT STATE ESTIMATOR

(71) Applicant: Caterpillar Trimble Control Technologies LLC, Dayton, OH (US)

(72) Inventors: Francisco Roberto Green, New Carlisle, OH (US); Bruce John Wiewel, East Peoria, IL (US)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,429

(22) Filed: Nov. 16, 2015

(65) Prior Publication Data

US 2016/0153167 A1  Jun. 2, 2016

Related U.S. Application Data (63) Continuation-in-part of application No. 14/463,106, filed on Aug. 19, 2014, now Pat. No. 9,222,237.

(51) Int. Cl.
  *B62D 11/00* (2006.01)
  *E02F 3/84* (2006.01)
  *E02F 9/26* (2006.01)

(52) U.S. Cl.
  CPC ............ *B62D 11/001* (2013.01); *E02F 3/845* (2013.01); *E02F 9/265* (2013.01)

(58) Field of Classification Search
  CPC ......... E02F 3/844; E02F 3/7613; E02F 3/845; E02F 9/265; B62D 11/001
  See application file for complete search history.

(56) References Cited

U.S. PATENT DOCUMENTS

| | | |
|---|---|---|
| 5,462,125 A | 10/1995 | Stratton et al. |
| 5,467,829 A | 11/1995 | Barton et al. |

(Continued)

OTHER PUBLICATIONS

Fowler, Mark, "Inclinometers—the good, the bad and the future", 9th International Symposium on Field Measurements in Geomechanics, www.fmgm2015.com/media, Australian Centre for Geomechanics, Dec. 2013 Newsleter.

Henrik Rehbinder, et al., "Frift-free attitude estimation for accelerated rigid bodies", Science Direct, vol. 40, Issue 4, Apr. 2004, pp. 653-659.

(Continued)

*Primary Examiner* — Michael D Lang
(74) *Attorney, Agent, or Firm* — Dinsmore & Shohl LLP (57) ABSTRACT

Terrain-based machines are provided comprising a translational chassis movement indicator, a terrain-based implement, an implement inclinometer, and an implement state estimator. The translational chassis movement indicator provides a measurement indicative of movement of the machine chassis in one or more translational degrees of freedom. The implement inclinometer comprises (i) an implement accelerometer, which provides a measurement indicative of acceleration of the terrain-based implement in one or more translational or rotational degrees of freedom and (ii) an implement angular rate sensor, which provides a measurement of a rate at which the terrain-based implement is rotating in one or more degrees of rotational freedom. The implement state estimator generates an implement state estimate that is based at least partially on (i) implement position signals from an implement angular rate sensor and an implement accelerometer, and (ii) signals from the translational chassis movement indicator and the implement inclinometer.

23 Claims, 2 Drawing Sheets

(56) References Cited

U.S. PATENT DOCUMENTS

| | | | |
|---|---|---|---|
| 5,499,684 | A | 3/1996 | Stratton |
| 5,560,431 | A | 10/1996 | Stratton |
| 5,964,298 | A | 10/1999 | Greenspun |
| 6,073,069 | A | 6/2000 | Kim |
| 6,112,145 | A | 8/2000 | Zachman |
| 7,121,355 | B2 | 10/2006 | Lumpkins et al. |
| 7,317,977 | B2 | 1/2008 | Matrosov |
| 7,588,088 | B2 | 9/2009 | Zachman |
| 7,970,519 | B2 | 6/2011 | Green |
| 8,406,963 | B2 | 3/2013 | Farmer et al. |
| 8,473,166 | B2 | 6/2013 | Zhdanov et al. |
| 8,634,991 | B2 | 1/2014 | Douglas |
| 8,738,242 | B2 | 5/2014 | Konno et al. |
| 2010/0299031 | A1 | 11/2010 | Zhdanov et al. |
| 2012/0236142 | A1 | 9/2012 | Enix |
| 2012/0239258 | A1 | 9/2012 | Konno et al. |
| 2013/0158819 | A1 | 6/2013 | Callaway |
| 2014/0207331 | A1 | 7/2014 | Kosarev et al. |

OTHER PUBLICATIONS www.can-cia.org, "Gyro-Aided Inclinometer for Dynamic Measurements", can Newsletter Mar. 2011.

Mikkelsen, P. Eric, "Symposium on Field Measurements in Geomechanics", FMGM 2003, Oslo, Norway, September.

Caterpillar, "D3C-Series III Hystat & Series III Track-Type Tractors", 1997.

Jun, Myungsoo, et al., "State Estimation of an Autonomous Helicopter Using Kalman Filtering", Department of Electrical Engineering—Systems, Department of Computer Science, Institute for Robotics and Intelligent Systems, University of Southern California, Los Angeles, CA 90089-0781, Intelligent Robots and Systems, 1999, IROS '99, Proceedings, 1999 IEEE/RSJ International Conference on (vol. 3).

Caterpillar, CAT Medium Track-Type Tractors, D6-D7-D8, Application Guide, 2010.

HSG-IMIT, "Gyro-Inclinometer Based on Micro-Machined Inertial Sensors", Sensors and Actuators A: Physical, vols. 97-98, Apr. 1, 2002, pp. 557-562.

Search Report pertaining to International Application No. PCT/US2015/044989 dated Nov. 12, 2015.

Fig. 4

TERRAIN-BASED MACHINE COMPRISING IMPLEMENT STATE ESTIMATOR

CROSS-REFERENCE TO RELATED APPLICATIONS

The present disclosure claims priority to and is a continuation-in-part of U.S. patent application Ser. No. 14/463,106, filed Aug. 19, 2014 and entitled "EARTHMOVING MACHINE COMPRISING WEIGHTED STATE ESTIMATOR," the entirety of which is incorporated by reference herein.

BACKGROUND

The present disclosure relates to terrain-based machines and, more particularly, to technology for controlling the position of an implement thereof. For example, and not by way of limitation, terrain-based machines such as bulldozers and other types of earthmoving or other material-moving machines such as pavers or paving machines typically have a hydraulically controlled earthmoving or other implement that can be manipulated by a joystick or other means in an operator control station of the machine. The user of the machine can control the lift, tilt, angle and pitch of the implement, which may, for example, be the blade of a bulldozer or other type of track-type tractor and/or a material-moving machine such as a paver.

BRIEF SUMMARY

According to the subject matter of the present disclosure, a system is provided for enabling enhanced automated control of a terrain-based implement of a terrain-based machine, such as the earthmoving implement of an earthmoving machine or the blade or screed of a paving machine, in at least one degree of rotational freedom. Terrain-based machines, as described herein, are structurally configured to move along an underlying terrain and carry an associated terrain-based implement that physically interacts with the underlying terrain. Contemplated terrain types include, but are not limited to, earth, pavement, sand, rocks, gravel, and the like.

In accordance with some embodiments of the present disclosure, terrain-based machines are provided comprising a translational chassis movement indicator, a terrain-based implement, an implement inclinometer, and an implement state estimator. The translational chassis movement indicator provides a measurement indicative of movement of the machine chassis in one or more translational degrees of freedom. The implement inclinometer comprises (i) an implement accelerometer, which provides a measurement indicative of acceleration of the terrain-based implement in one or more translational or rotational degrees of freedom and (ii) an implement angular rate sensor, which provides a measurement of a rate at which the terrain-based implement is rotating in one or more degrees of rotational freedom. The implement state estimator generates an implement state estimate that is based at least partially on (i) implement position signals from an implement angular rate sensor and an implement accelerometer, and (ii) signals from the translational chassis movement indicator and the implement inclinometer.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Terrain-based machines according to some contemplated embodiments of the present disclosure can be initially described with reference to the earthmoving machine 100 illustrated in FIGS. 1 and 2. While reference is made to an earthmoving machine 100, any terrain-based machine having one or more terrain-based implements is contemplated by the present disclosure. Generally, the earthmoving machine 100 comprises a machine chassis 10, a translational chassis drive 20, a translational chassis movement indicator 30, an earthmoving implement 40, an implement inclinometer 50, and an implement state estimator 60, and implement control architecture 70.

Figure 2:
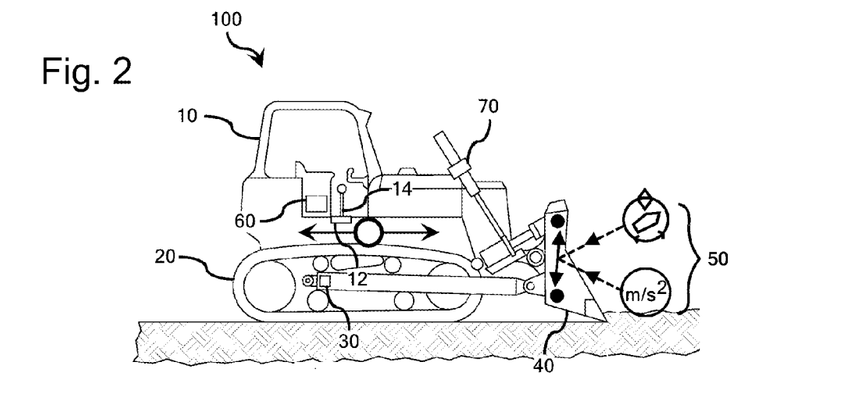
FIG. 2 is a symbolic illustration of an earthmoving machine according some embodiments of the present disclosure.

As is illustrated schematically in FIG. 2, and as will be readily understood by those familiar with earthmoving equipment and practicing the concepts of the present disclosure, the earthmoving implement 40 is coupled to the machine chassis 10 such that translational movement imparted to the machine chassis 10 by the translational chassis drive 20 is also imparted to the earthmoving implement 40. In addition, the earthmoving implement 40 is configured for rotational movement in one or more target degrees of rotational freedom.

The translational chassis movement indicator 30 provides a measurement that indicates movement of the machine chassis 10 in one or more translational degrees of freedom. It is contemplated that the translational chassis movement indicator 30 may be presented in a variety of ways to provide a signal that is indicative of translational machine movement. For example, it is contemplated that a translational chassis movement indicator 30 may be provided as a supplemental machine component that relies at least partially on data from the movement control module 12 of the earthmoving machine 100 and is placed in communication with the movement control module 12 to provide the measurement indicative of movement of the machine chassis. In this sense, the translational chassis movement indicator 30 can be described as an external movement sensor associated with the earthmoving machine. Examples of external movement sensors include, but are not limited to, a measurement wheel, a radar-based or GPS-based speed measurement device, or any other device that can be configured to provide an indication of chassis speed, position, acceleration, or a combination thereof.

Alternatively, it is contemplated that the movement control module 12 of the earthmoving machine 100, which is responsive to machine movement inputs from a joystick 14 or other user interface of the earthmoving machine 100, may function as a translational chassis movement indicator by providing signals that are indicative of translational chassis movement. In this sense, the translational chassis movement indicator can be seen as part of the pre-existing hardware of the earthmoving machine 100. In any case, it is contemplated that the indication provided by the translational chassis movement indicator 30 may represent movement of the chassis, movement of a motive component of the earthmoving machine, or a combination thereof. For example, where the earthmoving machine comprises an engine, a translational track, or both, the represented movement may comprise engine revolutions, track speed, or both.

An inclinometer is an instrument that can be used for measuring angles of tilt with respect to gravity. This is also known as a tilt meter, tilt indicator, pitch & roll sensor, level meter, and gradiometer. Inclinometers, which are used in a wide variety of industrial systems, can be used to measure angular tilt, pitch, and roll of an earthmoving implement, e.g., the blade of a bulldozer. Accordingly, in the illustrated embodiment, the implement inclinometer 50 comprises (i) an implement accelerometer, which provides a measurement indicative of acceleration of the earthmoving implement 40 in one or more translational or rotational degrees of freedom and (ii) an implement angular rate sensor, which provides a measurement of a rate at which the earthmoving implement 40 is rotating in one or more degrees of rotational freedom.

It is noted that the subject matter of the present disclosure is directed to inclinometers that comprise at least two components: an accelerometer, which senses the combination of linear motion and gravity, and a gyro or other type of an angular rate sensor, which senses changes in orientation. More specifically, the accelerometer measures how fast an object is accelerating in one or more translational or rotational degrees of freedom and the gyro measures how fast an object is moving in one or more degrees of rotational freedom. The present disclosure is not limited to particular accelerometer or gyro configurations. Nor is it limited to their respective manners of operation. Rather, it is contemplated that those practicing the concepts of the present disclosure may refer to conventional and yet to be developed teachings on inclinometers and, more particularly, inclinometers that utilize one or more accelerometers and one or more gyros, an example of which is the SCC1300-D04, Combined Gyroscope and 3-axis Accelerometer available from Murata Electronics.

It is contemplated that inclinometers according to the present disclosure may be configured to generate an implement state estimate that accounts for sensing bias, as bias shift is often the most common systematic error experienced in inclinometer measurements (see, for example, Fowler et al., "Inclinometers—the Good, the Bad and the Future," 9th International Symposium on Field Measurements in Geomechanics, www.fmgm2015.com/media, and Rehbinder et al., "Drift-free Attitude Estimation for Accelerated Rigid Bodies," Automatica 40 (2004) 653-659, which proposes a state estimation algorithm that fuses data from rate gyros and accelerometers to give long-term drift free attitude estimates). Regardless of the particular type of inclinometer used in practicing the concepts of the present disclosure, it is noteworthy that state estimation using a dynamic model and state measurements is a well-established area in the control industry and its application may take a number of different forms. For instance, a single axis of acceleration may be measured which includes a single axis of gyro measurement. This may suffice for a single axis of blade pitch or blade slope control. In this simple case, we could model the system by the simple equation:

$$\frac{d\theta_x}{dt} = \omega_x$$

where $\theta_x$ is the rotation around axis x, which is perpendicular to axis y, and $$\theta_x = \arcsin(\text{acceleration } y).$$

For two accelerometers and one gyro, the system could be modeled as follows:

$$\theta x = \arctan\left(\frac{\text{Acceleration } Z}{\text{Acceleration } Y}\right)$$

where axis x is perpendicular to axes y and z.

For a dual axis system with two accelerometers and two gyros, the system could be modeled as follows:

$$\frac{d\theta_x}{dt} = fx(\omega_x, \omega_y, \theta x, \theta y)$$

$$\frac{d\theta_y}{dt} = fy(\omega_x, \omega_y, \theta x, \theta y)$$

where $$\theta x = \arcsin(\text{acceleration } Y) \text{ and}$$

$$\theta y = \arcsin(\text{acceleration } X).$$

For a tri-axial system with three accelerometers and three gyros, the system could be modeled as follows:

$$\frac{d\theta_x}{dt} = fx(\omega_x, \omega_y, \omega_z, \theta x, \theta y)$$

$$\frac{d\theta_y}{dt} = fy(\omega_x, \omega_y, \omega_z, \theta x, \theta y)$$

$$\frac{d\theta_z}{dt} = fz(\omega_x, \omega_y, \omega_z, \theta x, \theta y)$$

where $$\theta x = \arctan\left(\frac{\text{Acceleration } Y}{\sqrt{(\text{Acceleration } X)^2 + (\text{Acceleration } Z)^2}}\right)$$

and $$\theta y = \arctan\left(\frac{\text{Acceleration } X}{\sqrt{(\text{Acceleration } Y)^2 + (\text{Acceleration } Z)^2}}\right)$$

The previous equations for acceleration are generally accurate in the static case. In the dynamic case, it is contemplated that it may be necessary to incorporate angular rates and distances to pivot points in the system models, as may be gleaned from teachings on basic three dimensional dynamics.

The functions $fx(\omega_x, \omega_y, \theta x, \theta y)$, $fy(\omega_x, \omega_y, \theta x, \theta y)$, and $fz(\omega_x, \omega_y, \omega_z, \theta x, \theta y)$ are, in their simplest form:

$$fx(\omega_x, \omega_y, \theta x, \theta y) = \omega_x$$

$$fy(\omega_x, \omega_y, \theta x, \theta y) = \omega_y$$

$$fz(\omega_x, \omega_y, \omega_z, \theta x, \theta y) = \omega_z$$

However, it is noted that more elaborate expressions for these functions can be developed with reference to conventional and yet-to-be developed teachings involving the use of Euler rotations, Quaternions, or a similar three-dimensional analysis which is well known to those skilled in the art of inertial navigation.

It is also contemplated that measurements of acceleration can be used to correct angle estimates and measurements of gyro rate can be used to correct angle rate estimates. More complicated behaviors, such as gyro or accelerometer bias may also be expressed mathematically and estimated in the dynamic equations. In addition, multiple axes of rotation and acceleration could be combined using Euler rotations, quaternions, or other three dimensional methods to provide a more complete solution as is commonly done for aircraft navigation. Kalman filtering can be added which better optimize the solution for this estimation using the understood dynamics.

Referring again to FIGS. 1 and 2, the implement state estimator 60 comprises suitable processing hardware for executing a fusion algorithm that generates an implement state estimate $I_{STATE}$ based at least partially on implement position signals $I_1$, $I_2$. The implement position signal $I_1$ can be received from the implement angular rate sensor of the implement inclinometer 50 and the implement position signal $I_2$ can be received from the implement accelerometer of the implement inclinometer 50, each of which are illustrated schematically in FIG. 2 and are mechanically coupled to the earthmoving implement 40.

Figure 1:
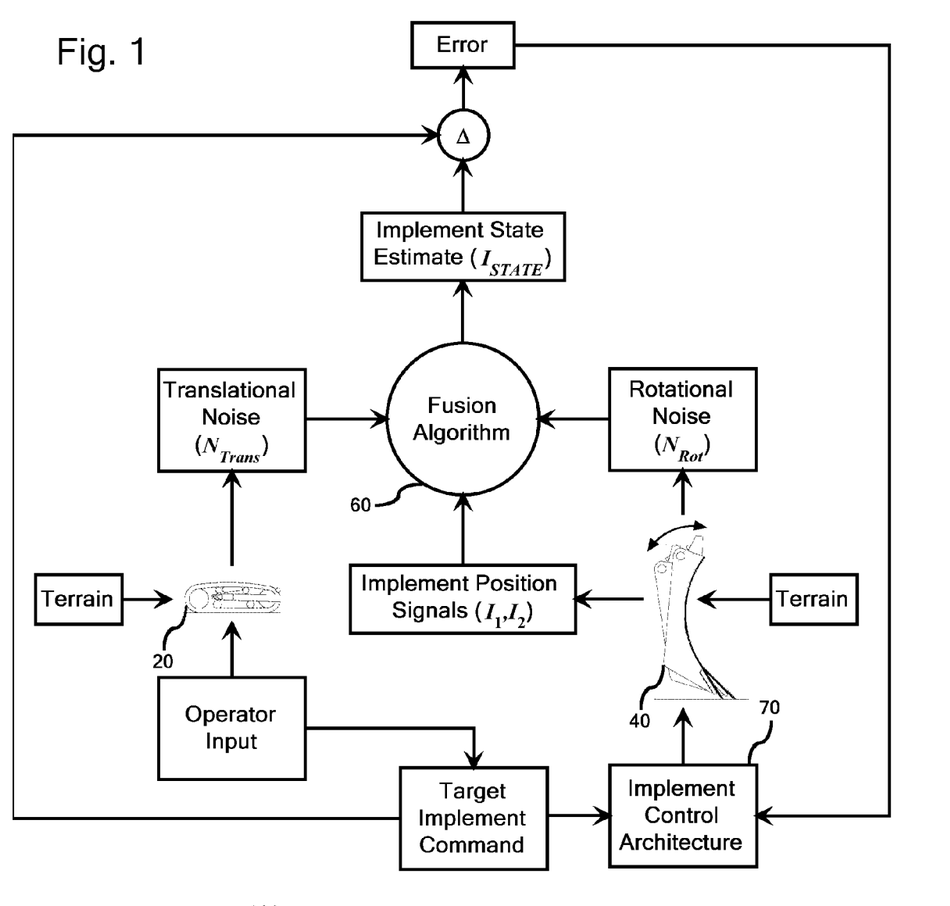
FIG. 1 is a schematic illustration of portions of a system for automated implement control in an earthmoving machine according to some embodiments of the present disclosure.
Figure 3:
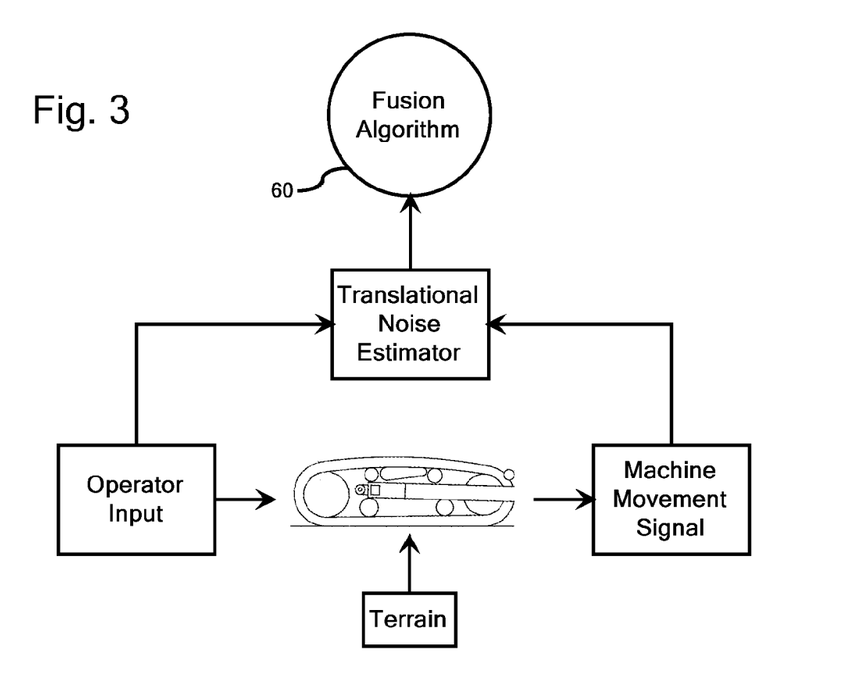
FIG. 3, is a schematic illustration of a translational noise estimator portion of a system for automated implement control in an earthmoving machine according to some embodiments of the present disclosure.

As is illustrated in FIG. 1, the implement state estimator 60 executes the fusion algorithm as a further function of a translational noise signal $N_{Trans}$ and a rotational noise signal $N_{Rot}$. The origin of the translational noise signal $N_{Trans}$ is illustrated with more particularity in FIG. 3, which illustrates schematically that the translational noise signal $N_{Trans}$ is at least partially a function of the nature of the terrain over which the earthmoving machine 100 traverses in response to operator input at a user interface of the earthmoving machine 100. FIG. 3 also illustrates that the translational noise signal $N_{Trans}$ is derived at least partially from a machine movement signal from the translational chassis movement indicator 30. The translational noise signal $N_{Trans}$ may also be derived by comparing the machine movement signal with the corresponding operator input that initiates machine movement. Additional detail regarding the origin of the machine movement signal is presented below.

Figure 4:
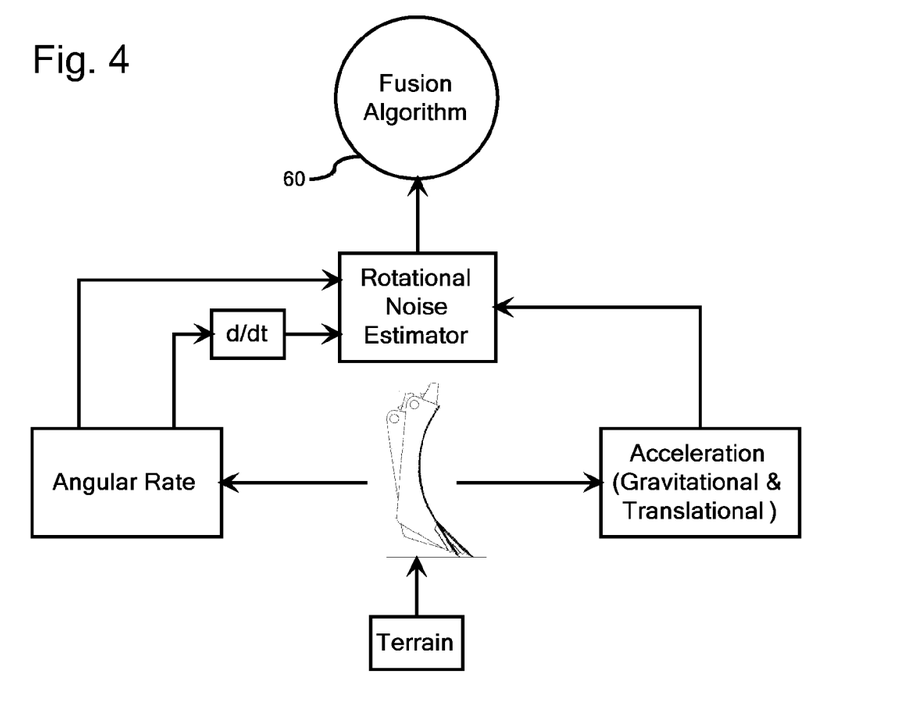
FIG. 4, is a schematic illustration of a rotational noise estimator portion of a system for automated implement control in an earthmoving machine according to some embodiments of the present disclosure.

The origin of the rotational noise signal $N_{Rot}$ is illustrated with more particularity in FIG. 4, which illustrates schematically that the signal is at least partially a function of the nature of the terrain over which the earthmoving machine 100 traverses and is derived at least partially from the implement inclinometer, such that $$I_{STATE}=f(I_1,I_2,W)$$

where the implement position signal $I_1$ can be received from the implement angular rate sensor of the implement inclinometer 50, the implement position signal $I_2$ can be received from the implement accelerometer of the implement inclinometer 50, and W represents one or more weighting factors that represent the translational noise signal $N_{Trans}$, the rotational noise signal $N_{Rot}$, or both. Additional detail regarding the nature of the weighting factor W and the manner in which it is applied is presented below.

As is illustrated schematically in FIG. 1, the implement control architecture 70, which comprises the electronic and mechanical hardware and the associated software for manipulating the earthmoving implement, utilizes an error signal generated from a comparison A of the implement state estimate $I_{STATE}$ and a target implement command derived from operator input for controlling rotational movement of the earthmoving implement 40 in the target degree(s) of rotational freedom.

The present inventors have recognized that, where the dynamics of an earthmoving implement 40 are monitored using a combination of an implement angular rate sensor (e.g., a gyro) and an implement accelerometer, it is best to tailor the relative weight that is attributed to signals from these components as a function of system noise by using the aforementioned weighting factor W. For example, an implement accelerometer generally performs better than an implement gyro or other type of angular rate sensor where there is little or no vibratory or other type of accelerative noise in the system. However, even though implement gyros and other types of angular rate sensors generally perform better than implement accelerometers under relatively high noise conditions, care must be taken to avoid complete reliance on these sensors because they often introduce other measurement biases that may render them inaccurate under certain conditions. Accordingly, particular concepts of the present disclosure are directed to the use of the aforementioned weighting factor W in the determination of an implement state estimate $I_{STATE}$ to help establish a suitable balance in the use of signals from implement angular rate sensors and implement accelerometers as a function of the translational noise signal $N_{Trans}$, the rotational noise signal $N_{Rot}$, or both.

Fusion algorithms according to particular embodiments of the present disclosure can be structured such that the implement state estimate relies more heavily on the implement position signal $I_1$ received from an implement angular rate sensor than the implement position signal $I_2$ received from an implement accelerometer as either or both of the translational and rotational noise signals $N_{Trans}$, $N_{Rot}$ increases. Referring to FIG. 2, the translational noise signal $N_{Trans}$ can be a representation of the translational accelerations of the machine chassis 10 and the rotational noise signal $N_{Rot}$ can be a representation of the rotational accelerations of the earthmoving implement 40.

It is contemplated that the weighting factor W can directly or indirectly represent the magnitude of the translational noise signal $N_{Trans}$, the rotational noise signal $N_{Rot}$, or both, or be a binary value indicating whether the translational noise signal $N_{Trans}$, the rotational noise signal $N_{Rot}$, or both, are at or above a particular magnitude. Alternatively, the weighting factor W can represent the likelihood that the translational noise signal $N_{Trans}$, the rotational noise signal $N_{Rot}$, or both, will reach a particular magnitude. In some embodiments, it is contemplated that the weighting factor W can be represented in the fusion algorithm as change in feedback gain associated with either the implement angular rate sensor, the implement accelerometer, or both. In which case, the weighting factor W would serve to decrease implement accelerometer gain or increase angular rate sensor gain as noise increases.

Generally, Kalman filters can be used for fusing data from different sensors to get an optimal estimate in a statistical sense. If the system can be described with a linear model and both the system error and the sensor error can be modeled as white Gaussian noise, then the Kalman filter will provide a unique statistically optimal estimate for the fused data. This means that under certain conditions the Kalman filter is able to find the best estimates based on the "correctness" of each individual measurement. The measurements from a group of sensors can be fused using a Kalman filter to provide both an estimate of the current state of a system and a prediction of the future state of the system. Kalman filters are particularly well-suited for use in the sensor fusion of the present disclosure because the inputs to a Kalman filter include the system measurements and noise properties of the system and the sensors. In addition, the output of a Kalman filter can be based on a weighted average of the system measurements. Accordingly, it is contemplated that the weighting factor can be represented in the fusion algorithm as a controllable variable of a Kalman filter, e.g., as a variable setting adjusting Kalman filter gain.

For example, in the instance where, as set forth above:

$$\theta x = \arcsin(\text{acceleration } Y)$$
$$\frac{d\theta_x}{dt} = \omega_x$$

A state estimator may be created in a simple form such that:

$$\theta x = \int \frac{d\theta_x}{dt} dt = \int \omega_x dt$$

However, the present inventors have recognized that this is an open loop form of an estimate and is prone to drift. Accordingly, assuming that, through measurements of acceleration, we can measure the state of θx, we can create a simple estimate of the form:

$$\theta x = \int \omega_x dt - k(\theta_x^m - \theta x)$$

where $\theta_x^m$ is the angle estimated directly from measurement of the dynamic acceleration. It is contemplated that this estimate can be improved via use of a Kalman filter or conventional or yet to be developed optimizing means. Further, it is contemplated that measurements in multiple axes, e.g., two or three axes, can be utilized to improve the accuracy of the estimation as well as predict the angular movement on additional axes of measurement. The use of Kalman filters and the practice of extending the relationship of angular rate change to angular movements is well known in the industry and can be suitably applied to the methodology of the present disclosure. The aforementioned example is presented herein merely to clarify the methodology of the present disclosure and should not be taken as a limitation on the scope of the appended claims.

In any case, the adaptive estimation scheme of the present disclosure can be implemented to modify reliance of the estimate, θx, on the measurement of the angle from acceleration, $\theta_x^m$, based on signals indicating an unhealthy or excessive amount of acceleration is present, such that:

$$\theta x = \int \omega_x dt - k(\text{Rotational Acceleration Signal,Translational Acceleration Signal})*(\theta_x^m - \theta x)$$

It is contemplated that a machine movement signal or other signal indicative of machine rotational rate may be used in conjunction with or as a replacement for the measured rotational rate. For example, if the right track speed of a track type machine is twice as fast as the left track speed, it is likely that the machine is banking a curve and turning. Also, a machine's joystick input may be used to generate a indications of increased machine speed or a change in direction/orientation. In any case, it is important to note that the concepts of the present disclosure can be implemented such that the influence of acceleration feedback can be reduced when large amounts of rotational or translational acceleration are detected and that the implementation of this methodology may be achieved in a variety of different ways.

Referring to FIG. 2, although the concepts of the present disclosure are described herein with primary reference to a bulldozer 10 or other type of track-type tractor (TTT), it is noted that the scope of the present disclosure is more broadly applicable to any terrain-based machine that uses an earth-moving or other terrain-based implement that can be pitched, tilted, angled, or otherwise moved in one or more rotational degrees of freedom. It is contemplated that the implement state estimator can be configured to execute a fusion algorithm that generates an implement state estimate $I_{STATE}$ based at least partially on implement position signals $I_1$, $I_2$ for each of a plurality of rotational degrees of freedom selected from pitch, roll, and yaw of the terrain-based implement that may be, for example, a dozer blade or a paver blade.

Given the fact that earthmoving machines are commonly equipped to execute turns during periods where the position of the machine implement is subject to control, it is also contemplated that those practicing the concepts of the present disclosure may find it beneficial to refer to U.S. Pat. No. 7,970,519 ("Control for an Earthmoving System While Performing Turns") to address issues with acceleration while performing turns.

For the purposes of describing and defining the present invention, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters. It is also noted that recitations herein of "at least one" component, element, etc., should not be used to create an inference that the alternative use of the articles "a" or "an" should be limited to a single component, element, etc.

It is noted that recitations herein of a component of the present disclosure being "configured," or "programmed" in a particular way, to embody a particular property, or to function in a particular manner, are structural recitations, as opposed to recitations of intended use. More specifically, the references herein to the manner in which a component is "programmed" or "configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A terrain-based machine comprising a machine chassis, a translational chassis drive, a translational chassis movement indicator, a terrain-based implement, an implement inclinometer, an implement state estimator, and implement control architecture, wherein:
   the terrain-based implement is coupled to the machine chassis such that translational movement imparted to the machine chassis by the translational chassis drive is also imparted to the terrain-based implement;
   the terrain-based implement is configured for rotational movement in one or more target degrees of rotational freedom;
   the translational chassis movement indicator provides a measurement indicative of movement of the machine chassis in one or more translational degrees of freedom;
   the implement inclinometer comprises
      (i) an implement accelerometer, which provides a measurement indicative of acceleration of the terrain-based implement in one or more translational or rotational degrees of freedom and
      (ii) an implement angular rate sensor, which provides a measurement of a rate at which the terrain-based implement is rotating in one or more degrees of rotational freedom;
   the implement state estimator executes a fusion algorithm that generates an implement state estimate $I_{STATE}$ based at least partially on implement position signals $I_1$, $I_2$, where the implement position signal $I_1$ is received from an implement angular rate sensor and the implement position signal $I_2$ is received from an implement accelerometer, both of which are mechanically coupled to the terrain-based implement;
   the implement state estimator executes the fusion algorithm as a further function of a translational noise signal $N_{Trans}$ derived at least partially from the translational chassis movement indicator and a rotational noise signal $N_{Rot}$ derived at least partially from the implement inclinometer such that $$I_{STATE}=f(I_1,I_2,W)$$

where W represents one or more weighting factors that represent the translational noise signal $N_{Trans}$ the rotational noise signal $N_{Rot}$, or both; and
   the implement control architecture utilizes the implement state estimate $I_{STATE}$ and a target implement command to control rotational movement of the terrain-based implement in the one or more target degrees of rotational freedom based on a comparison of the implement state estimate $I_{STATE}$ and the tar et implement command.

2. A terrain-based machine as claimed in claim 1 wherein the fusion algorithm is structured such that the implement state estimate relies more heavily on the implement position signal $I_1$ received from an implement angular rate sensor than the implement position signal $I_2$ received from an implement accelerometer as the translational noise signal $N_{Trans}$ increases.

3. A terrain-based machine as claimed in claim 1 wherein the fusion algorithm is structured such that the implement state estimate relies more heavily on the implement position signal $I_1$ received from an implement angular rate sensor than the implement position signal $I_2$ received from an implement accelerometer as the rotational noise signal $N_{Rot}$ increases.

4. A terrain-based machine as claimed in claim 1 wherein the fusion algorithm is structured such that the implement state estimate relies more heavily on the implement position signal $I_1$ received from an implement angular rate sensor than the implement position signal $I_2$ received from an implement accelerometer as either the translational noise signal $N_{Trans}$ or the rotational noise signal $N_{Rot}$ increases.

5. A terrain-based machine as claimed in claim 1 wherein the translational noise signal $N_{Trans}$ represents translational accelerations of the machine chassis.

6. A terrain-based machine as claimed in claim 1 wherein the rotational noise signal $N_{Rot}$ represents rotational accelerations of the terrain-based implement.

7. A terrain-based machine as claimed in claim 1 wherein the weighting factor is represented in the fusion algorithm as a representation of a likelihood that the translational noise signal $N_{Trans}$, the rotational noise signal $N_{Rot}$, or both, will reach a particular magnitude.

8. A terrain-based machine as claimed in claim 1 wherein the weighting factor is represented in the fusion algorithm as a binary value indicating whether the translational noise signal $N_{Trans}$, the rotational noise signal $N_{Rot}$, or both, are at or above a particular magnitude.

9. A terrain-based machine as claimed in claim 1 wherein the weighting factor is represented in the fusion algorithm as a value indicating a magnitude of the translational noise signal $N_{Trans}$, the rotational noise signal $N_{Rot}$, or both.

10. A terrain-based machine as claimed in claim 1 wherein the weighting factor is represented in the fusion algorithm as change in feedback gain associated with either the implement angular rate sensor, the implement accelerometer, or both.

11. A terrain-based machine as claimed in claim 1 wherein the weighting factor is represented in the fusion algorithm as a controllable variable of a Kalman filter.

12. A terrain-based machine as claimed in claim 1 wherein the implement state estimate $I_{STATE}$ corresponds at least partially to the pitch of the terrain-based implement.

13. A terrain-based machine as claimed in claim 1 wherein the implement state estimator executes a fusion algorithm that generates an implement state estimate $I_{STATE}$ based at least partially on implement position signals $I_1$, $I_2$ for each of a plurality of rotational degrees of freedom selected from pitch, roll, and yaw of the terrain-based implement.

14. A terrain-based machine as claimed in claim 1 wherein:
   the terrain-based machine comprises a movement control module responsive to machine movement inputs from a user interface; and
   the movement control module functions as the translational chassis movement indicator.

15. A terrain-based machine as claimed in claim 1 wherein:
   the terrain-based machine comprises a movement control module responsive to machine movement inputs from a user interface; and the translational chassis movement indicator is in communication with the movement control module and relies at least partially on data from the movement control module to provide the measurement indicative of movement of the machine chassis.

16. A terrain-based machine as claimed in claim 1 wherein the translational chassis movement indicator comprises an external movement sensor, a movement sensor associated with the terrain-based machine, or a combination thereof.

17. A terrain-based machine as claimed in claim 1 wherein the translational chassis movement indicator provides an indication of either speed, position, acceleration, or a combination thereof.

18. A terrain-based machine as claimed in claim 17 wherein the indication provided by the translational chassis movement indicator represents movement of the chassis, movement of a motive component of the terrain-based machine, or a combination thereof.

19. A terrain-based machine as claimed in claim 18 wherein the terrain-based machine comprises an engine, a translational track, or both, and the represented movement comprises engine revolutions, track speed, or both.

20. A terrain-based machine as claimed in claim 1 wherein the terrain-based machine comprises an earthmoving machine or a paving machine.

21. A terrain-based machine as claimed in claim 1 wherein the terrain-based machine comprises a dozer and the terrain-based implement comprises a dozer blade.

22. A terrain-based machine as claimed in claim 1 wherein the terrain-based machine comprises a paving machine and the terrain-based implement comprises a paver blade or screed.

23. A terrain-based machine comprising a machine chassis, a translational chassis drive, a translational chassis movement indicator, a terrain-based implement, an implement inclinometer, and an implement state estimator, wherein:

the terrain-based implement is coupled to the machine chassis such that translational movement imparted to the machine chassis by the translational chassis drive is also imparted to the terrain-based implement;

the terrain-based implement is configured for rotational movement in at least one degree of rotational freedom;

the translational chassis movement indicator provides a measurement indicative of movement of the machine chassis in one or more translational degrees of freedom;

the implement inclinometer comprises
  (i) an implement accelerometer, which provides a measurement indicative of acceleration of the terrain-based implement in one or more translational or rotational degrees of freedom and
  (ii) an implement angular rate sensor, which provides a measurement of a rate at which the terrain-based implement is rotating in one or more degrees of rotational freedom;

the implement state estimator generates an implement state estimate based at least partially on implement position signals from an implement angular rate sensor and an implement accelerometer, signals from the translational chassis movement indicator and the implement inclinometer, and one or more weighting factors representative of noise in the signals from the translational chassis movement indicator and the implement inclinometer; and the implement control architecture utilizes the implement state estimate and a target implement command to control rotational movement of the terrain-based implement in the one or more target degrees of rotational freedom based on a comparison of the implement state estimate $I_{STATE}$ and the target implement command.

* * * * *

UNITED STATES PATENT AND TRADEMARK OFFICE
CERTIFICATE OF CORRECTION

| | | |
|---|---|---|
| PATENT NO. | : 9,580,104 B2 | Page 1 of 1 |
| APPLICATION NO. | : 14/942429 | |
| DATED | : February 28, 2017 | |
| INVENTOR(S) | : Francisco Roberto Green et al. | |

It is certified that error appears in the above-identified patent and that said Letters Patent is hereby corrected as shown below:

In the Claims

Column 9, Claim 1, Line 62:
"state estimate $I_{STATE}$ and the tar et implement com-"
Should read:
--state estimate $I_{STATE}$ and the target implement com- --.

Signed and Sealed this
Third Day of October, 2017

Joseph Matal
*Performing the Functions and Duties of the*
*Under Secretary of Commerce for Intellectual Property and*
*Director of the United States Patent and Trademark Office*